United States Patent
Li et al.

(10) Patent No.: US 12,028,218 B2
(45) Date of Patent: Jul. 2, 2024

(54) SYSTEM AND METHOD FOR VIRTUAL NETWORK FUNCTION AND MULTI-ACCESS EDGE COMPUTING TOPOLOGY

(71) Applicant: Chunghwa Telecom Co., Ltd., Taoyuan (TW)

(72) Inventors: Wen-Sheng Li, Taoyuan (TW); Si-An Ciou, Taoyuan (TW); Chi-Te Chiu, Taoyuan (TW); Chun-Hao Chen, Taoyuan (TW); Jia-An Tsai, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 389 days.

(21) Appl. No.: 17/509,054

(22) Filed: Oct. 24, 2021

(65) Prior Publication Data
US 2023/0081959 A1   Mar. 16, 2023

(30) Foreign Application Priority Data
Sep. 15, 2021   (TW) .................................. 110134326

(51) Int. Cl.
*H04L 41/12* (2022.01)
*H04L 41/22* (2022.01)

(52) U.S. Cl.
CPC .............. *H04L 41/12* (2013.01); *H04L 41/22* (2013.01)

(58) Field of Classification Search
CPC ........ H04L 41/12; H04L 41/22; H04L 41/122
See application file for complete search history.

(56) References Cited

U.S. PATENT DOCUMENTS

| | | | |
|---|---|---|---|
| 10,298,466 B2 | 5/2019 | Li et al. | |
| 10,432,460 B2 | 10/2019 | Li et al. | |
| 10,447,547 B2 | 10/2019 | Vrzic et al. | |
| 10,448,242 B2 | 10/2019 | Georgiev | |
| 10,681,150 B2 | 6/2020 | Li et al. | |
| 2018/0316543 A1* | 11/2018 | Hwang | H04L 41/5003 |
| 2019/0068463 A1 | 2/2019 | Li | |
| 2019/0199597 A1* | 6/2019 | Valisammagari | H04L 41/145 |
| 2020/0186442 A1 | 6/2020 | Nazarzadeoghaz et al. | |

(Continued)

FOREIGN PATENT DOCUMENTS

| | | |
|---|---|---|
| CN | 108667777 | 10/2018 |
| CN | 106856438 | 2/2020 |
| CN | 107113232 | 9/2020 |

(Continued)

*Primary Examiner* — Austin J Moreau
(74) *Attorney, Agent, or Firm* — JCIPRNET

(57) ABSTRACT

A system and a method for managing a virtual network function (VNF) and a multi-access edge computing (MEC) topology are provided. The method includes the following steps. A first VNF descriptor (VNFD) corresponding to a first VNF is received. According to the first VNFD, first provision data is generated. According to the first VNFD, first internal topology information of the first VNF is generated. According to the first provision data, the first VNF is instantiated to be provisioned. In response to provisioning the first VNF, a graphical user interface including the first internal topology information is output, and the first internal topology information includes a network component communicatively connected to the first VNF.

6 Claims, 5 Drawing Sheets

(56) References Cited

U.S. PATENT DOCUMENTS

2023/0024067 A1\* 1/2023 Li .................. H04L 41/145

FOREIGN PATENT DOCUMENTS

| EP | 3249871 | | 11/2017 |
|----|---------|---|---------|
| EP | 3501141 | | 6/2019 |
| KR | 20180057086 A | \* | 5/2018 |
| WO | 2019082085 | | 5/2019 |

\* cited by examiner

SYSTEM AND METHOD FOR VIRTUAL NETWORK FUNCTION AND MULTI-ACCESS EDGE COMPUTING TOPOLOGY

CROSS-REFERENCE TO RELATED APPLICATION

This application claims the priority benefit of Taiwan application serial no. 110134326, filed on Sep. 15, 2021. The entirety of the above-mentioned patent application is hereby incorporated by reference herein and made a part of this specification.

BACKGROUND

Technical Field

The disclosure relates to a system and a method for managing a virtual network function (VNF), and more particularly to a system and a method for managing a virtual network function and a multi-access edge computing topology.

Description of Related Art

At present, the existing technology often uses a network function virtualization management and orchestration (NFV MANO) framework formulated by the European Telecommunications Standard Institute (ETSI) to implement cloud management systems. After onboarding a virtual network function, the NFV MANO framework may respond to requests of clients for instantiating the onboarded virtual network function, allowing clients to use network resources related to the virtual network function.

During establishing a topology connection of a virtual network function for a virtual service, a descriptor of the virtual network function is required to be uploaded through a cloud management system. The NFV MANO framework may provision the virtual network function according to the descriptor. However, a traditional NFV MANO framework may only use the descriptor to configure a topology of the virtual network function, which results in that virtual network function management cannot be flexibly established and updated due to over dependence on the descriptor. Therefore, how to provide a simple and fast virtual network function topology configuration method is one of the important topics in this field.

SUMMARY

The disclosure provides a system and a method for managing a virtual network function and a multi-access edge computing topology, which may provide a graphical user interface for managing a topology of the virtual network function.

The system for managing the virtual network function and the multi-access edge computing topology of the disclosure includes a processor and a storage medium. The storage medium stores multiple modules. The processor is coupled to the storage medium, accessing and executing the multiple modules including a management module, a network function virtualization orchestrator universal framework module, a network topology universal module, and a network instantiation universal management module. The management module receives a first virtual network function descriptor corresponding to a first virtual network function. The network function virtualization orchestrator universal framework module generates first provision data according to the first virtual network function descriptor. The network topology universal module generates first internal topology information of the first virtual network function according to the first virtual network function descriptor. The network instantiation universal management module is communicatively connected to a virtualized infrastructure manager, and the network instantiation universal management module instantiates the first virtual network function according to the first provision data for provisioning the first virtual network function. The management module outputs a graphical user interface including the first internal topology information in response to provisioning the first virtual network function, and the first internal topology information includes a network component communicatively connected to the first virtual network function.

In an embodiment of the disclosure, the above network topology universal module generates a virtual network function list corresponding to the first virtual network function according to the first internal topology information and second internal topology information corresponding to a second virtual network function, and the virtual network function list includes a label of the second virtual network function.

In an embodiment of the disclosure, the above management module outputs the virtual network function list and the first topology information through the graphical user interface, and the first topology information includes an external network interface.

In an embodiment of the disclosure, the above management module receives an operation instruction of dragging the label of the second virtual network function from the virtual network function list to the external network interface, and the network instantiation universal management module establishes a connection between the first virtual network function and the second virtual network function according to the operation instruction.

In an embodiment of the disclosure, the above management module outputs an unfilled parameter corresponding to the first virtual network function and the second virtual network function in response to receiving the operation instruction, and the management module receives a filled parameter corresponding to the unfilled parameter. The network instantiation universal management module establishes the connection according to the filled parameter.

In an embodiment of the disclosure, the above management module receives a configuration instruction, and the network instantiation universal management module updates the connection according to the configuration instruction.

In an embodiment of the disclosure, the above unfilled parameter includes at least one of a network segment and an Internet protocol address.

In an embodiment of the disclosure, the above network instantiation universal management module accesses the network component to obtain network component information, and the first internal topology information includes the network component information.

In an embodiment of the disclosure, the above network instantiation universal management module receives network information corresponding to the connection, establishes a routing rule according to the network information, and establishes the connection according to the routing rule.

The method for managing the virtual network function and the multi-access edge computing topology of the disclosure includes the following steps. A first virtual network function descriptor corresponding to a first virtual network function is received. According to the first virtual network function descriptor, first provision data is generated. According to the first virtual network function descriptor, first internal topology information of the first virtual network function is generated. According to the first provision data, the first virtual network function is instantiated to be provisioned. In response to provisioning the first virtual network function, a graphical user interface including the first internal topology information is output, and the first internal topology information includes a network component communicatively connected to the first virtual network function.

Based on the above, the disclosure may output internal topology information of virtual network functions through the graphical user interface, and the graphical user interface may further display relevant information of a network component of in a topology regardless of brands. Users may operate the graphical user interface to flexibly and rapidly establish or update a connection relationship between virtual network functions, and may establish the association between virtual network functions without writing a descriptor. Therefore, the disclosure may bring benefits of simplifying operations and greatly reduce the threshold and time cost of users establishing a virtual network function topology.

DESCRIPTION OF THE EMBODIMENTS

Figure 1:
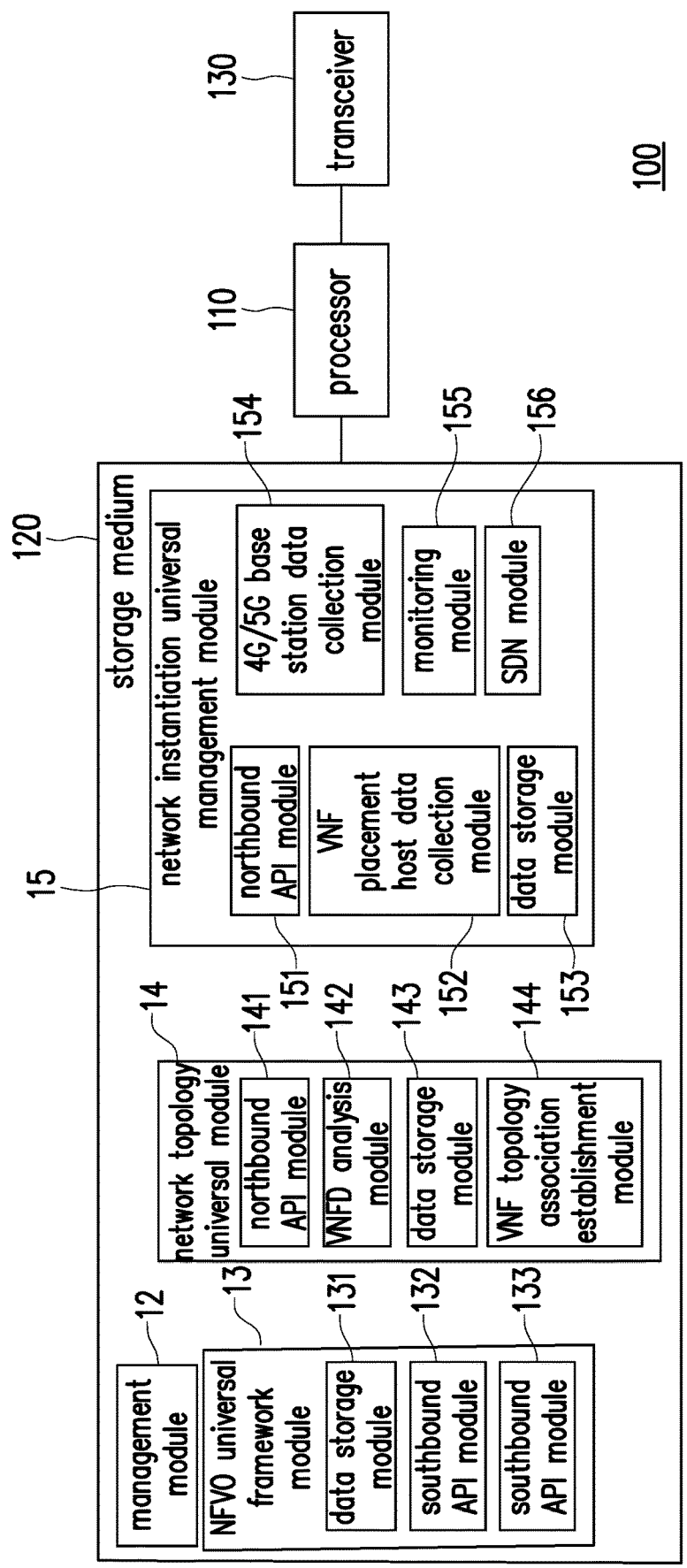
FIG. 1 is a schematic diagram of a system for managing a virtual network function and a multi-access edge computing topology according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 is a schematic diagram of a system 100 for managing a virtual network function and a multi-access edge computing topology according to an embodiment of the disclosure. The system 100 may include a processor 110, a storage medium 120, and a transceiver 130.

The processor 110 is, for example, a central processing unit (CPU) or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar component or a combination of the above components. The processor 110 may be coupled to the storage medium 120 and the transceiver 130, accessing and executing multiple modules and various application programs stored in the storage medium 120.

The storage medium 120 is, for example, any type of fixed or mobile random access memory (RAM), read-only memory (ROM), flash memory, hard disk drive (HDD), solid state drive (SSD), or similar component or a combination of the above components for storing multiple modules or various application programs that may be executed by the processor 110. In this embodiment, the storage medium 120 may store a management module 12, a network function virtualization orchestrator (NFVO) universal framework module 13, a network topology universal module (or referred to as a virtual network function manager (VNFM) module) 14, a network instantiation universal management module 15, and the like.

The NFVO universal framework module 13 may include a data storage module 131, a southbound application programming interface (API) module 132, and a southbound API module 133. The NFVO universal framework module 13 may communicate with the network topology universal module 14 through the southbound API module 132, and may communicate with the network instantiation universal management module 15 through the southbound API module 133.

The network topology universal module 14 may include a northbound API module 141, a virtual network function descriptor (VNFD) analysis module 142, a data storage module 143, and a VNF topology association establishment module 144.

The network instantiation universal management module 15 may include a northbound API module 151, a VNF placement host data collection module 152, a data storage module 153, a 4G/5G base station data collection module 154, a monitoring module 155, and a software defined network (SDN) module 156.

The transceiver 130 transmits and receives signals in a wireless or wired manner. The transceiver 130 may further execute, for example, low-noise amplification, impedance matching, frequency mixing, up/down frequency conversion, filtering, amplification, and similar operations.

Each module in the storage medium 120 may be embedded in an NFV MANO framework defined by ETSI. For example, the management module 12 may be embedded in a telecommunication business and operation support system (BOSS) including an operations support system (OSS) and/or a business support system (BSS), and may be used to implement various functions in the BOSS. The NFVO universal framework module 13 may be used to replace a traditional NFVO universal framework module. The network topology universal module 14 or the network instantiation universal management module 15 may be embedded in a VNFM universal framework module, and may be used to implement various functions of the VNFM universal framework module.

Figure 2:
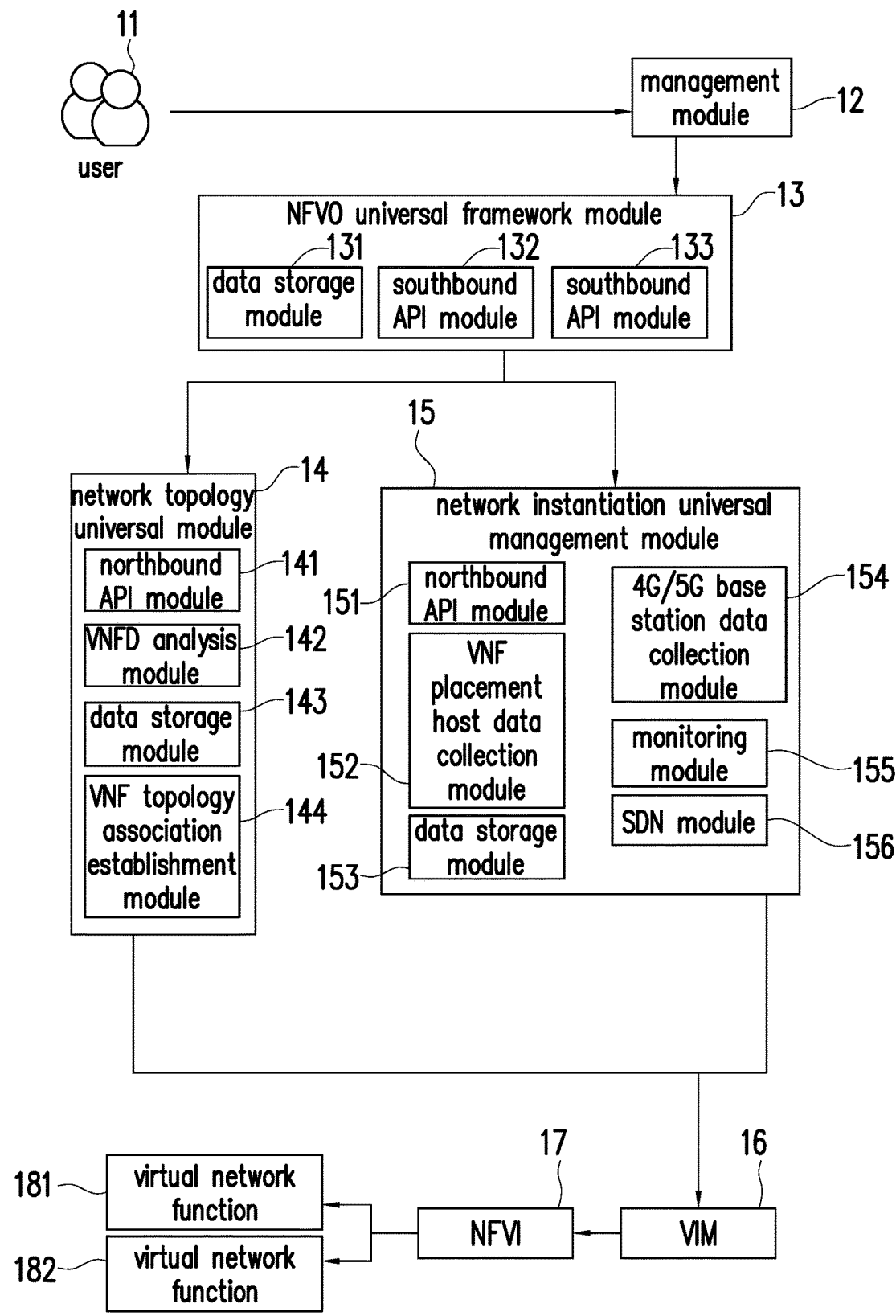
FIG. 2 is a schematic diagram of an NFV MANO framework based on a system according to an embodiment of the disclosure.

FIG. 2 is a schematic diagram of an NFV MANO framework based on the system 100 according to an embodiment of the disclosure. The NFV MANO framework may include the management module 12, the NFVO universal framework module 13, the network topology universal module 14, and the network instantiation universal management module 15 of the system 100. The NFV MANO framework may further include a virtualized infrastructure manager (VIM) 16, a network functions virtualization infrastructure (NFVI) 17, a virtual network function 181, and a virtual network function 182.

The management module 12 may provide a graphical user interface (GUI), and may input or output data through the graphical user interface. The management module 12 may display topology information of virtual network functions for reference of users through the graphical user interface.

The NFVO universal framework module 13 may receive a virtual network function descriptor for provisioning a virtual network function. The NFVO universal framework module 13 may further manage or orchestrate relevant resources of the virtual network function, and may communicate with corresponding modules. The NFVO universal framework module 13 may be communicatively connected to the management module 12, the network topology universal module 14, or the network instantiation universal management module 15.

The network topology universal module 14 may manage a life cycle of the virtual network function and may analyze a topology of the virtual network function.

The network instantiation universal management module 15 may automatically convert a connection requirement raised by a user through the graphical user interface into a connection routing rule of a physical network apparatus.

The VIM 16 may be a module for managing infrastructure resources. The VIM 16 may be communicatively connected to the network topology universal module 14 or the network instantiation universal management module 15.

The NFVI 17 may be an actual computing apparatus or storage apparatus.

Figure 3:
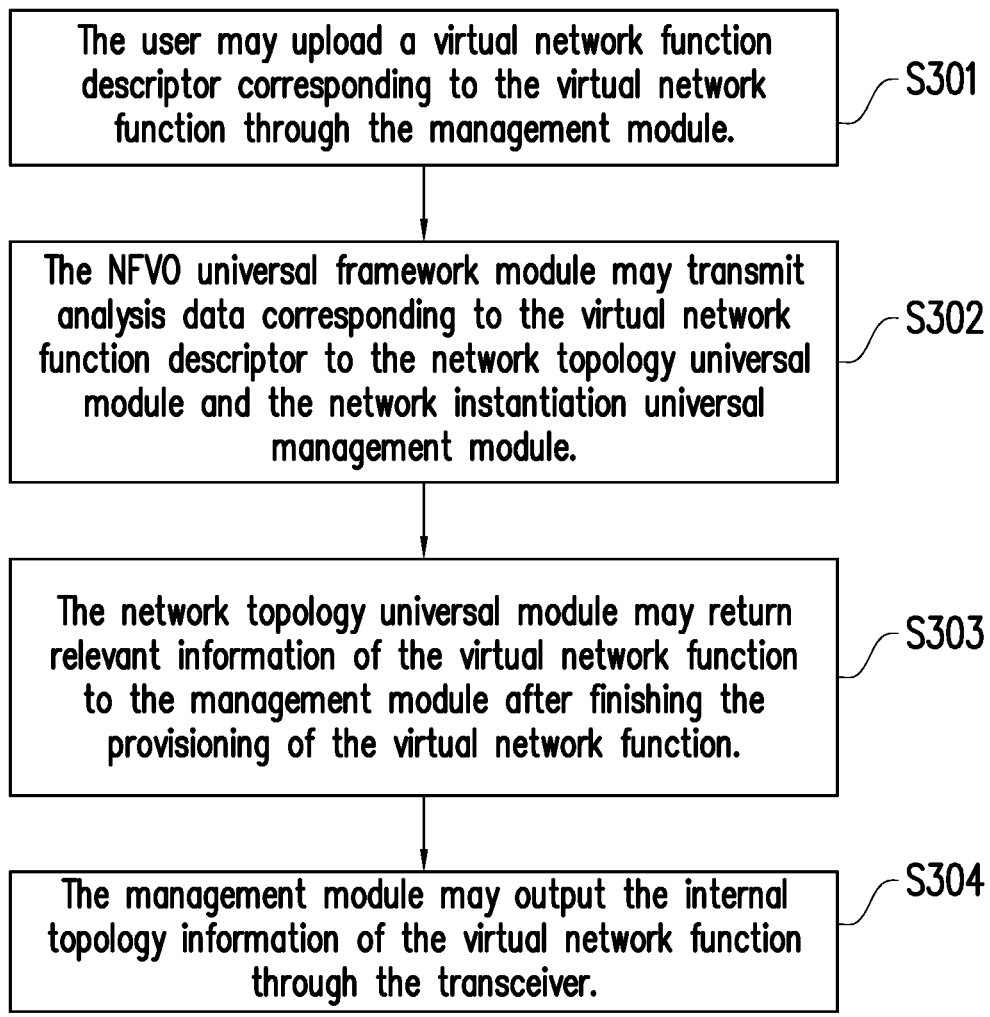
FIG. 3 is a flow chart of provisioning a virtual network function according to an embodiment of the disclosure.

FIG. 3 is a flow chart of provisioning the virtual network function 181 according to an embodiment of the disclosure.

In step S301, a user 11 may upload a virtual network function descriptor corresponding to the virtual network function 181 through the management module 12. Specifically, the management module 12 may be communicatively connected to an input device (such as a keyboard, a mouse, or a touch screen) through the transceiver 130. The user 11 may operate the input device to input the virtual network function descriptor to the management module 12. The virtual network function descriptor may include multi-access edge computing (MEC) or various cloud application programs.

In step S302, the NFVO universal framework module 13 may transmit analysis data corresponding to the virtual network function descriptor to the network topology universal module 14 and the network instantiation universal management module 15. Specifically, the management module 12 may transmit the virtual network function descriptor to the NFVO universal framework module 13. The NFVO universal framework module 13 may generate the analysis data according to the virtual network function descriptor, and may store the analysis data through the data storage module 131, in which the analysis data may include provision data of the virtual network function 181. The NFVO universal framework module 13 may transfer the virtual network function descriptor to the network topology universal module 14 through the southbound API module 132, and may transfer the provision data to the network instantiation universal management module 15 through the southbound API module 133. The network topology universal module 14 may receive the virtual network function descriptor through the northbound API module 141, and the network instantiation universal management module 15 may receive the provision data through the northbound API module 151. The network topology universal module 14 may provision the virtual network function 181 and manage the life cycle thereof according to the virtual network function descriptor.

In step S303, the network topology universal module 14 may return relevant information of the virtual network function 181 to the management module 12 after finishing the provisioning of the virtual network function 181. Specifically, the network instantiation universal management module 15 may instantiate the virtual network function 181 according to the virtual network function descriptor to provision the virtual network function 181. The network instantiation universal management module 15 may deploy the virtual network function 181 downstream of the NFVI 17 through the VIM 16.

The VNFD analysis module 142 of the network topology universal module 14 may analyze the virtual network function descriptor to generate relevant information of the virtual network function 181 after finishing the provisioning of the virtual network function 181, and the relevant information may include status information or internal topology information of the virtual network function 181. The internal topology information of the virtual network function 181 may include network components communicatively connected to the virtual network function 181 and network component information of these network components. The VNFD analysis module 142 may access the network components to obtain the network component information. The data storage module 143 of the network topology universal module 14 may store the internal topology information and other relevant information of the virtual network function 181.

In step S304, the management module 12 may output the internal topology information of the virtual network function 181 through the transceiver 130. Specifically, the management module 12 may provide a graphical user interface including the internal topology information of the virtual network function 181. The management module 12 may be communicatively connected to an input/output device (such as a keyboard, a touch screen, or a display) through the transceiver 130 and output the graphical user interface through the input/output device to display relevant information such as the internal topology information of the virtual network function 181 for reference of the user 11.

Figure 4:
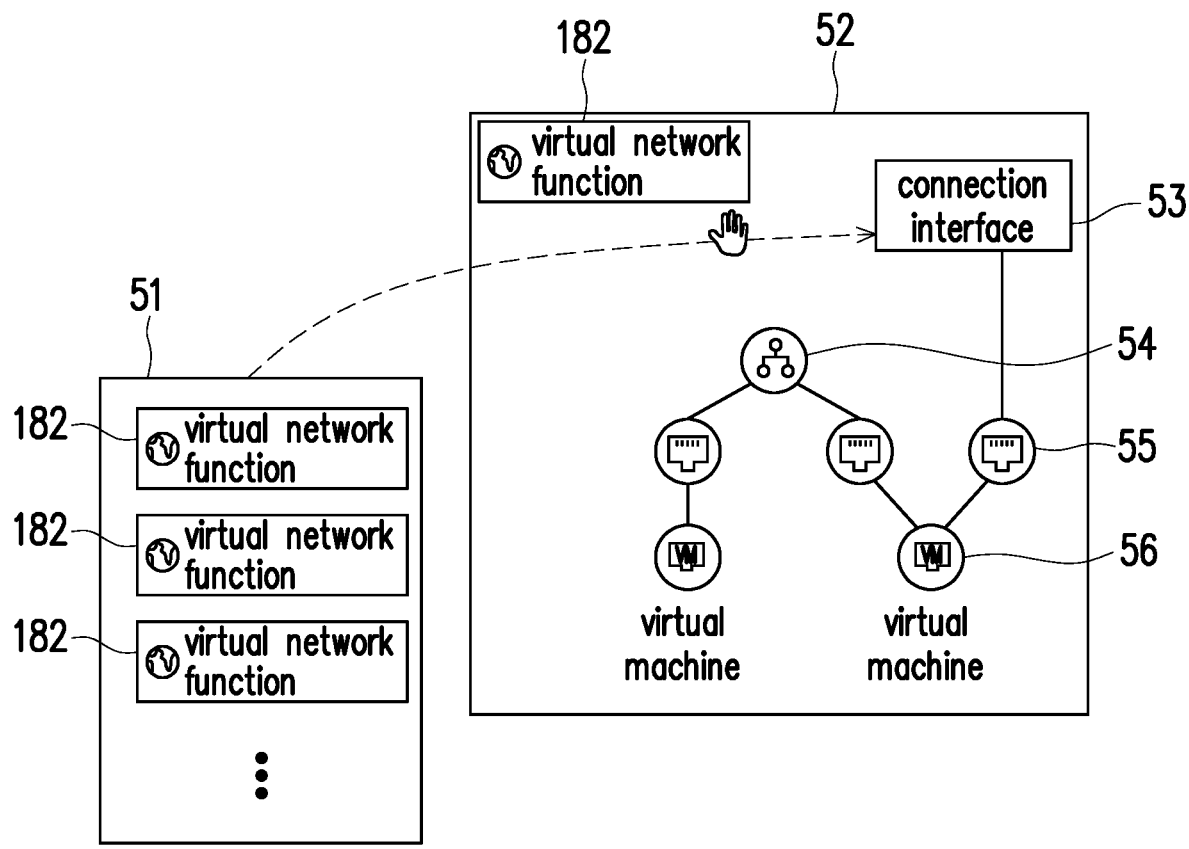
FIG. 4 is a schematic diagram of a graphical user interface according to an embodiment of the disclosure.

FIG. 4 is a schematic diagram of a graphical user interface according to an embodiment of the disclosure. The graphical user interface may include a virtual network function list 51 and an internal topology data 52 of the virtual network function 181, and the virtual network function list 51 may include a label of a virtual network function (such as the virtual network function 182) that may be connected to the virtual network function 181. The internal topology data 52 may include a network component communicatively connected with the virtual network function 181, such as a virtual sub-network 54, a network connection interface 55, or a virtual machine (VM) 56. The internal topology data 52 may further include an external network interface 53 for being communicatively connected with other virtual network functions.

Figure 5:
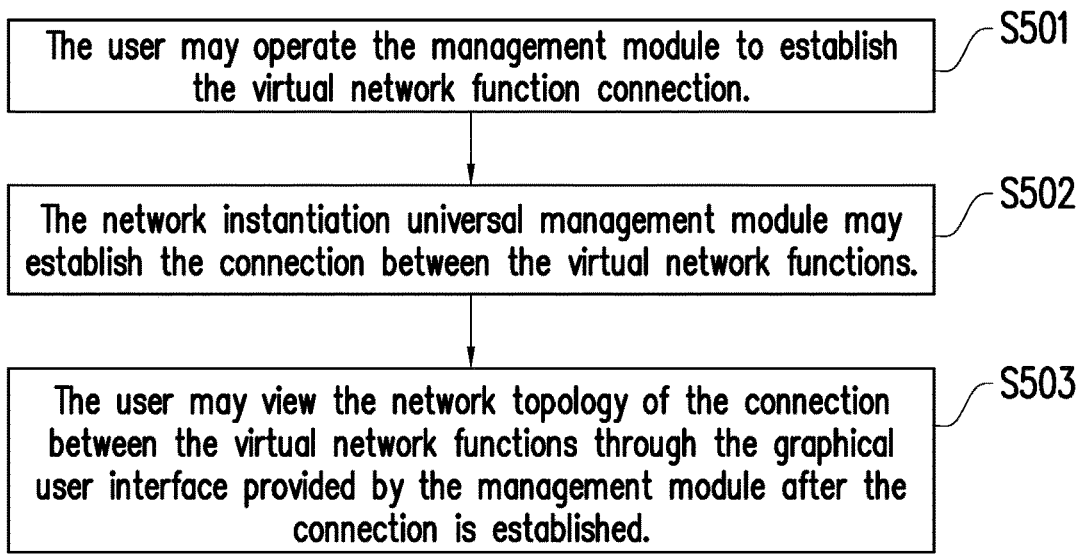
FIG. 5 is a flow chart of establishing a connection of a virtual network function according to an embodiment of the disclosure.

FIG. 5 is a flow chart of establishing a connection of the virtual network function 181 according to an embodiment of the disclosure. In step S501, the user 11 may operate the management module 12 to establish the connection of the virtual network function 181. Specifically, the system 100 may provision the virtual network function 182 in a similar way to steps S301 to S304. The VNFD analysis module 142 may analyze the virtual network function descriptor of the virtual network function 182 to generate the internal topology information of the virtual network function 182 after finishing the provisioning of the virtual network function 182. The VNF topology association establishment module 144 may establish an association between the virtual network function 181 and the virtual network function 182 according to the internal topology information of the virtual network function 181 and the internal topology information of the virtual network function 182, thereby generating the virtual network function list 51 corresponding to the virtual network function 181 according to the association. The virtual network function list 51 may include the label of the virtual network function 182 that may be communicatively connected with the virtual network function 181.

The user 11 may operate the management module 12 through an operation instruction. The management module 12 may receive the operation instruction of dragging the label of the virtual network element 182 from the virtual network element list 51 to the external network interface 53. The network instantiation universal management module 15 may establish a connection between the virtual network function 181 and the virtual network function 182 according to the operation instruction.

In step S502, the network instantiation universal management module 15 may establish the connection between the virtual network function 181 and the virtual network function 182 according to requirements of the user 11. Specifically, the management module 12 may output an unfilled parameter corresponding to the virtual network function 181 and the second virtual network function 182 in response to receiving the operation instruction, and the unfilled parameter may include a network segment or an Internet protocol (IP) address. After the user 11 fills in the unfilled parameter and generates a filled parameter, the management module 12 may further receive the filled parameter corresponding to the unfilled parameter.

On the other hand, the VNF placement host data collection module 152 may collect location information of a source virtual network function (such as the virtual network function 181) and a destination virtual network function (such as the virtual network function 182), and may collect a part of network information corresponding to the connection. The part of network information may include a network routing activation status. The data storage module 153 may store relevant information of the network routing activation status. The 4G/5G base station data collection module 154 may collect location information of a 4G/5G base station, and may collect another part of the network information corresponding to the connection. The monitoring module 155 may monitor the network routing activation status, updating relevant information stored in the data storage module 153 and notifying the management module 12 when the network routing of the connection is activated. The SDN module 156 may establish a routing rule for automatic network connection planning according to network information collected by the VNF placement host data collection module 152 or the 4G/5G base station data collection module 154 and the filled parameter input by the user 11, and establishes the connection between the virtual network function 181 and the virtual network function 182 according to the routing rule.

In step S503, the user 11 may view a network topology of the connection between the virtual network function 181 and the virtual network function 182 through the graphical user interface provided by the management module 12 after the connection is established. In an embodiment, the management module 12 may receive a configuration instruction input by a user. The SDN module 156 of the network instantiation universal management module 15 may update the connection between the virtual network function 181 and the virtual network function 182 according to the configuration instruction.

Figure 6:
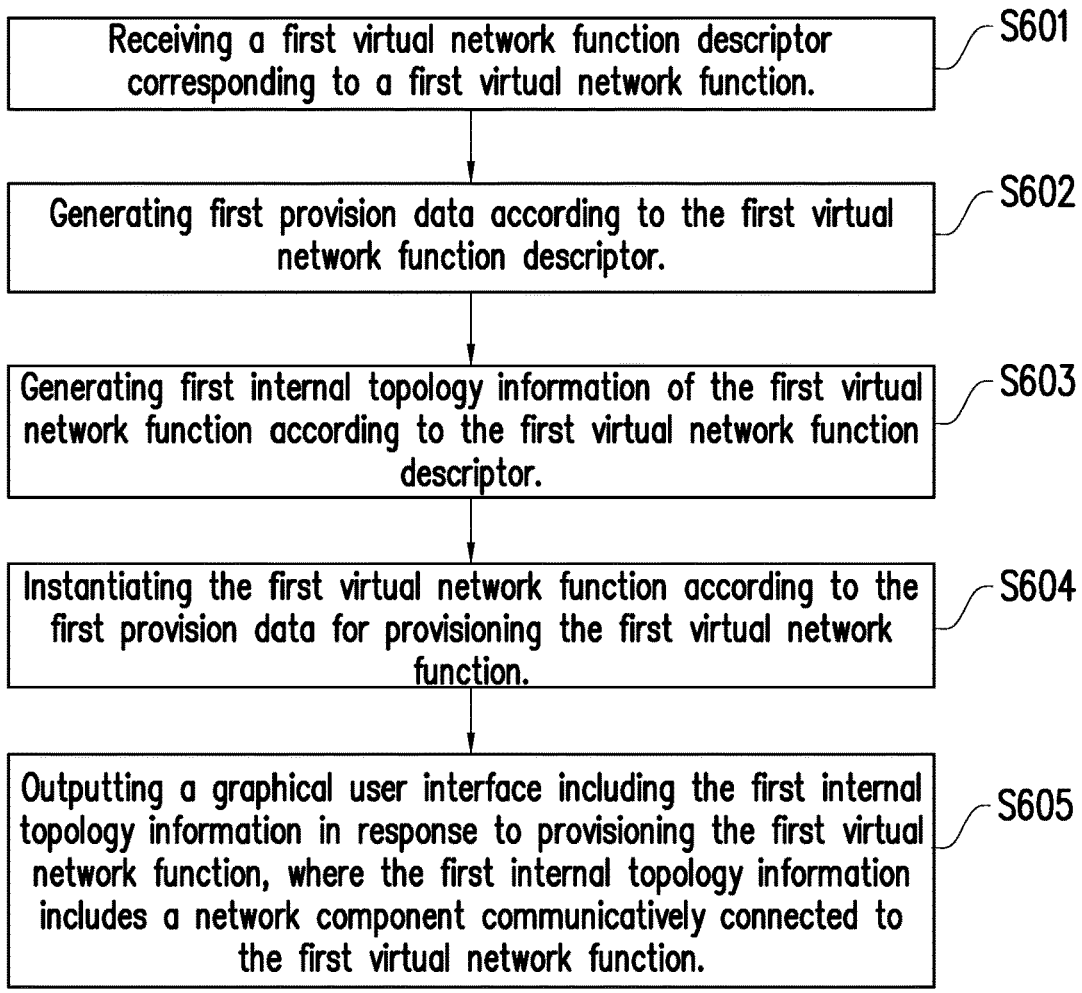
FIG. 6 is a flow chart of a method for managing a virtual network function and a multi-access edge computing topology according to an embodiment of the disclosure.

FIG. 6 is a flow chart of a method for managing a virtual network function and a multi-access edge computing topology according to an embodiment of the disclosure, and the method may be implemented by the system 100 in FIG. 1. In step S601, a first virtual network function descriptor corresponding to a first virtual network function is received. In step S602, first provision data is generated according to the first virtual network function descriptor. In step S603, first internal topology information of the first virtual network function is generated according to the first virtual network function descriptor. In step S604, according to the first provision data, the first virtual network function is instantiated to be provisioned. In step S605, in response to provisioning the first virtual network function, a graphical user interface including the first internal topology information is output, and the first internal topology information includes a network component communicatively connected to the first virtual network function.

In summary, the disclosure has the following features and functions.

The disclosure provides a system for managing a highly universal virtual network function and a multi-access edge computing topology in integration with the NFV MANO framework, allowing the NFV MANO framework to not only maintain the original advantages thereof but also be equipped with the function of rapidly establishing a virtual network function connection through the disclosure.

The network topology universal module of the disclosure may provide a universal VNF network topology analysis and management method, allowing the NFV MANO framework to analyze an association between individual units in virtual network functions or association information between the virtual network functions with information after the virtual network functions are provisioned. The NFV MANO framework may display a topological graph through a graphical user interface for reference of users according to the analyzed association information. Users may process a connection relationship between the virtual network functions and reduce overall operation complexity through the topological graph.

The network instantiation universal management module of the disclosure may be used to receive connection information set by users through the graphical user interface to analyze and convert network information of the virtual network functions, thereby automatically generating a network routing rule and automatically activating a network for enabling the connection between the virtual network functions through, for example, a 4G network or 5G network.

The graphical user interface of the disclosure may allow users to customize and modify a network topology of network functions through this interface, and to submit their requirements to the network instantiation universal management module for instantiation. Therefore, users may establish or update the connection for the virtual network functions without a VNF forwarding graph descriptor (VNFFGD). This graphical user interface renders the ETSI NFV MANO framework more flexible and adaptable in establishing network function topology connections.

What is claimed is:

1. A system for managing a virtual network function and a multi-access edge computing topology, comprising:

a storage medium, storing a plurality of modules; and a processor, coupled to the storage medium, accessing and executing the plurality of modules, wherein the plurality of modules comprise:
   a management module, receiving a first virtual network function descriptor corresponding to a first virtual network function;
   a network function virtualization orchestrator universal framework module, generating first provision data according to the first virtual network function descriptor;
   a network topology universal module, generating first internal topology information of the first virtual network function according to the first virtual network function descriptor; and
   a network instantiation universal management module, communicatively connected to a virtualization infrastructure manager, wherein the network instantiation universal management module instantiates the first virtual network function according to the first provision data for provisioning the first virtual network function, wherein
   the management module outputs a graphical user interface comprising the first internal topology information in response to provisioning the first virtual network function, and the first internal topology information comprises a network component communicatively connected to the first virtual network function, wherein the network topology universal module generates a virtual network function list corresponding to the first virtual network function according to the first internal topology information and second internal topology information corresponding to a second virtual network function, and the virtual network function list comprises a label of the second virtual network function, wherein the management module outputs the virtual network function list and the first internal topology information through the graphical user interface, and the first internal topology information comprises an external network interface, wherein the management module receives an operation instruction of dragging the label of the second virtual network function from the virtual network function list to the external network interface, and the network instantiation universal management module establishes a connection between the first virtual network function and the second virtual network function according to the operation instruction, wherein the management module outputs an unfilled parameter corresponding to the first virtual network function and the second virtual network function in response to receiving the operation instruction, the management module receives a filled parameter corresponding to the unfilled parameter, and the network instantiation universal management module establishes the connection according to the filled parameter.

2. The system according to claim 1, wherein the management module receives a configuration instruction, and the network instantiation universal management module updates the connection according to the configuration instruction.

3. The system according to claim 1, wherein the unfilled parameter comprises at least one of a network segment and an Internet protocol address.

4. The system according to claim 1, wherein the network instantiation universal management module accesses the network component to obtain network component information, and the first internal topology information comprises the network component information.

5. The system according to claim 1, wherein the network instantiation universal management module receives network information corresponding to the connection, establishes a routing rule according to the network information, and establishes the connection according to the routing rule.

6. A method for managing a virtual network function and a multi-access edge computing topology, comprising:
   receiving a first virtual network function descriptor corresponding to a first virtual network function;
   generating first provision data according to the first virtual network function descriptor;
   generating first internal topology information of the first virtual network function according to the first virtual network function descriptor;
   generating a virtual network function list corresponding to the first virtual network function according to the first internal topology information and second internal topology information corresponding to a second virtual network function, wherein the virtual network function list comprises a label of the second virtual network function;
   instantiating the first virtual network function according to the first provision data for provisioning the first virtual network function; and
   outputting a graphical user interface comprising the first internal topology information in response to provisioning the first virtual network function, wherein the first internal topology information comprises a network component communicatively connected to the first virtual network function;
   outputting the virtual network function list and the first internal topology information through the graphical user interface, wherein the first internal topology information comprises an external network interface;
   receiving an operation instruction of dragging the label of the second virtual network function from the virtual network function list to the external network interface and outputting an unfilled parameter corresponding to the first virtual network function and the second virtual network function in response to receiving the operation instruction; and
   establishing a connection between the first virtual network function and the second virtual network function according to the operation instruction, comprising: receiving a filled parameter corresponding to the unfilled parameter and establishing the connection according to the filled parameter.

\* \* \* \* \*